United States Patent [19]
Bartsch et al.

[11] Patent Number: 5,429,025
[45] Date of Patent: Jul. 4, 1995

[54] SEVERING APPARATUS FOR SHEET-LAMINATING MACHINES

[75] Inventors: Peter Bartsch, Burgthann; Karl Hoch, Eckental, both of Germany

[73] Assignee: Billhoefer Maschinenfabrik GmbH, Nuremberg, Germany

[21] Appl. No.: 143,422

[22] Filed: Oct. 26, 1993

[51] Int. Cl.[6] ............................................. B26D 1/29
[52] U.S. Cl. ....................................... 83/861; 83/337; 83/441; 83/446; 83/675
[58] Field of Search ............... 83/337, 592, 663, 441, 83/446, 861, 675

[56] References Cited

U.S. PATENT DOCUMENTS

| | | |
|---|---|---|
| 2,587,732 | 3/1952 | Jaeger ................................. 83/592 |
| 4,635,837 | 1/1987 | Granger ............................... 83/337 |

FOREIGN PATENT DOCUMENTS

| | | | |
|---|---|---|---|
| 0594966 | 11/1932 | Germany | ................................. 83/337 |
| 8805650 | 7/1988 | Germany | . |
| 4027431 | 8/1990 | Germany | . |

*Primary Examiner*—Kenneth E. Peterson
*Attorney, Agent, or Firm*—Jordan and Hamburg

[57] ABSTRACT

A severing apparatus for sheet-laminating machines for separating sheets, transported as single sheets and coated with a continuous film layer, with severing of the overhanging film layer in the edge region of the overlapping area by means of a moving knife, wherein on a rotary table taking hold of the sheet line from below, at least one and preferably several knives, distributed at equal intervals over the periphery, are pivotably mounted with an essentially radial cutting edge, which, by means of a cam control, on passing over the edge of the sheet line, can be lowered from a raised position into an operating position gliding on the sheet line and can be raised again running up from the sheet line, and wherein the circumferential speed of the knife section cutting into the film layer is appreciably greater than the conveying speed of the sheet line.

10 Claims, 2 Drawing Sheets

SEVERING APPARATUS FOR SHEET-LAMINATING MACHINES

BACKGROUND OF THE INVENTION

The invention relates to a severing apparatus for sheet-laminating machines for separating sheets, transported as single sheets and coated with a continuous film layer, with severing of the overhanging film layer in the edge region of the overlapping area by means of a moving knife.

For sheet-laminating machines with the known single-sheet transport, it is necessary to sever the coated, continuous film layer at least partially in the overlapping area of the sheets before the sheets are decollated, in order to ensure that the film layer tears off along the desired tear line during the mechanical decollating process and that the film layer applied suffers no damage.

In order to bring this about, various severing apparatuses have already become known, which make use of different techniques, such as the installations described in the German patent application P 40 27 431.4-26 and the utility patent G 88 05 650.3.

The technique, described in the patent application P 40 27 431.4-26, makes use of two rolls, which are disposed opposite one another without contacting each other and between which the film-coated sheets run. The lower of the two rolls serves as counter-pressure roll, while the upper is equipped with knives or a plurality of points, depending on the embodiment.

If several perforating knives, disposed one behind the other, are used, the problem arises that, aside from the fact that the surface of the film layer is constantly in contact with the tearing roll for the purpose of driving the latter, the peripheral speed of the roll must be coordinated very accurately with the conveying speed of the sheets, in order to ensure that the knives dip precisely at the overlapping area into the film layer. Any adaptation to different sheet sizes is therefore very expensive. If a plurality of revolving points are used instead of the knives, the film surface is not in contact with the tearing roll, since the latter is mounted at a defined distance above the film layer and there is contact only in the double-layer overlapping area, which leads to the driving of the tearing roll. The expensive and difficult coordination of the peripheral speed of the roll with the conveying speed of the sheet can therefore be omitted. However, a larger area of the film surface, namely the whole of the overlapping area, is gripped by the points and perforated and thus damaged. Moreover, in contrast with an incised film layer, problems can arise with tearing and tearing off the perforated film layer.

The installation described in the utility patent G 88 05 650.3 has knives in motion, movably mounted on a carrier and moved by means of pneumatically controlled cylinders addressed by a control unit for severing the film layer. Continuous film layers, running in parallel as well as consecutively, can be incised with this arrangement. However, the control of the cylinders is very complicated and expensive. The same is true for the cutting units, which must be shifted manually on the carrier.

Admittedly, the German patent application P 42 32 332.0 describes a severing apparatus, the construction of which is simpler and which is easier to control than that of the aforementioned utility patent. Said severing apparatus also has a translatorily movable knife, which in this case can be attached to a pivotably mounted rocker arm moved by a stepping motor. However, both arrangements with translatorily moved knives have the disadvantage that, on the one hand, the knife must constantly slide on the sheet and can thus damage the sheet and that, moreover, a control is necessarily required, which detects the overlapping area, in order to control the motion of the knives, so that a cutting motion is initiated when such an overlapping section is traversed.

SUMMARY OF THE INVENTION

It is therefore an object of the invention to design a severing apparatus for sheet-laminating machines of the initially named type in such a manner that, with a simple construction and without a special control mechanism for the overlapping area and therefore also without the need for a correlation with the conveying speed of the sheets, a reliable and careful cutting up of the film layer in the edge region is possible.

To accomplish this objective, provisions are made pursuant to the invention so that, on a rotary table taking hold of the sheet from below, at least one and preferably several knives, distributed at equal intervals over the periphery, are pivotably mounted with an essentially radial cutting edge, which, by means of a cam control, on passing over the edge of the sheet line, can be lowered from a raised position into an operating position gliding on the sheet line and can be raised again running up from the sheet line, and that the circumferential speed of the knife section cutting into the film layer is appreciably greater than the conveying speed of the sheet line.

To begin with, the severing apparatus, constructed pursuant to the invention, results in the significant advantage over all previously known arrangements that a special control mechanism for the severing apparatus, with respect to the conveying of the sheets, can be omitted completely. It is no longer necessary to determine when the overlapping section arrives in the severing apparatus and a complicated cycle control of the knife in correlation with such a scanning device for the arrival of the overlapping area is also no longer required. The peripheral speed of the knife is much higher than the conveying speed of the sheet line. This is also possible without any problems at high conveying speeds. It is therefore ensured that the knife or knives overtake the overlapping section sliding by on the rotary table and, in so doing, cut up the film layer.

The knives can be mounted particularly easily at the upper end of a supporting body penetrating the rotary table in a recess. The supporting body is mounted at its lower end on the rotary table and is provided with a crossarm with a sensing roller, which runs along a stationary cam control under the rotary table. By means of a simple, eccentrically disposed and/or constructed-cam control, it is thus possible to achieve in an extremely simple way that the knives, after they have left the sheet, are raised into a slightly tilted position, so that, on the opposite side, when they run up again on the sheet line, they lie above the sheet line and then, immediately after passing over the edge of the sheet, they are lowered again so that they are seated on the sheet line in order to cut up the film layer at the outer edge. Due to this only very brief superimpositioning while the knife is seated on the sheet line, there is less danger of damage to the edge region of the sheet line than in the case of the known translatory knives, which constantly slide on the sheet line. At the same time, the carrying bodies are prestressed by springs in the lowered working position of the knives. By means of an appropriate construction of the cam control, it is possible to make an adjustment so that either the sensing roller lies against the cam control even in the lowest position, which offers the possibility that the knife runs slightly above the sheet line and, with that, cannot damage the sheet line at all, or that the cam control is constructed so that, under the action of the spring, the knife slides on the sheet line and the sensing roller runs at a slight distance from the cam control.

In order to ensure a reliable incision in every case by the knife into the film overlapping areas of the sheet, provisions can be made in a further development of the invention so that lifting wedges for the edge of the sheet line are mounted on the rotary table ahead of the knives in the direction of rotation of said rotary table. Preferably, such lifting wedges can be disposed exchangeably with countersunk leading edges in depressions of the rotary table. These lifting wedges cause a slight tilting of the overlapping region so that the film layer in the overlapping region, which lies almost horizontally, that is, parallel to the rotary table in the case of thin paper sheets, is inclined somewhat, so that the knife can incise better.

In order to adapt the arrangement to different production conditions, particularly to the processing of different sheets, provisions can be made in a development of the invention so that the lifting wedges are disposed on an outer annular section of the rotary table, which can be loosened, fixed and rotated against the central region of the rotary table. In this way, the distance between the knives and the preceding lifting wedges can be altered, so that a correspondingly larger distance can be selected when the film layer of thicker sheets is severed.

Finally, it is also within the scope of the invention to construct the rotary table, which preferably can be driven by a direct-current motor, so as to be adjustable in height, preferably with a handwheel, relative to its supporting part, which can be mounted on the sheet conveying frame.

Further advantages, characteristic features and details of the invention arise out of the following description of an embodiment, as well as out of the accompany drawings FIG. 1 shows a plan view of an inventive severing apparatus, FIG. 2 shows an enlarged section along the line II—II of FIG. 1, FIG. 3 an offset section along the line III—III of FIG. 1, FIG. 4 shows an enlarged partial section of the right upper section IV in FIG. 3 with the clasp knife rotated up, and FIG. 5 shows a plan view of the severing apparatus on a smaller scale.

DESCRIPTION OF THE PREFERRED EMBODIMENTS

Figure 1:
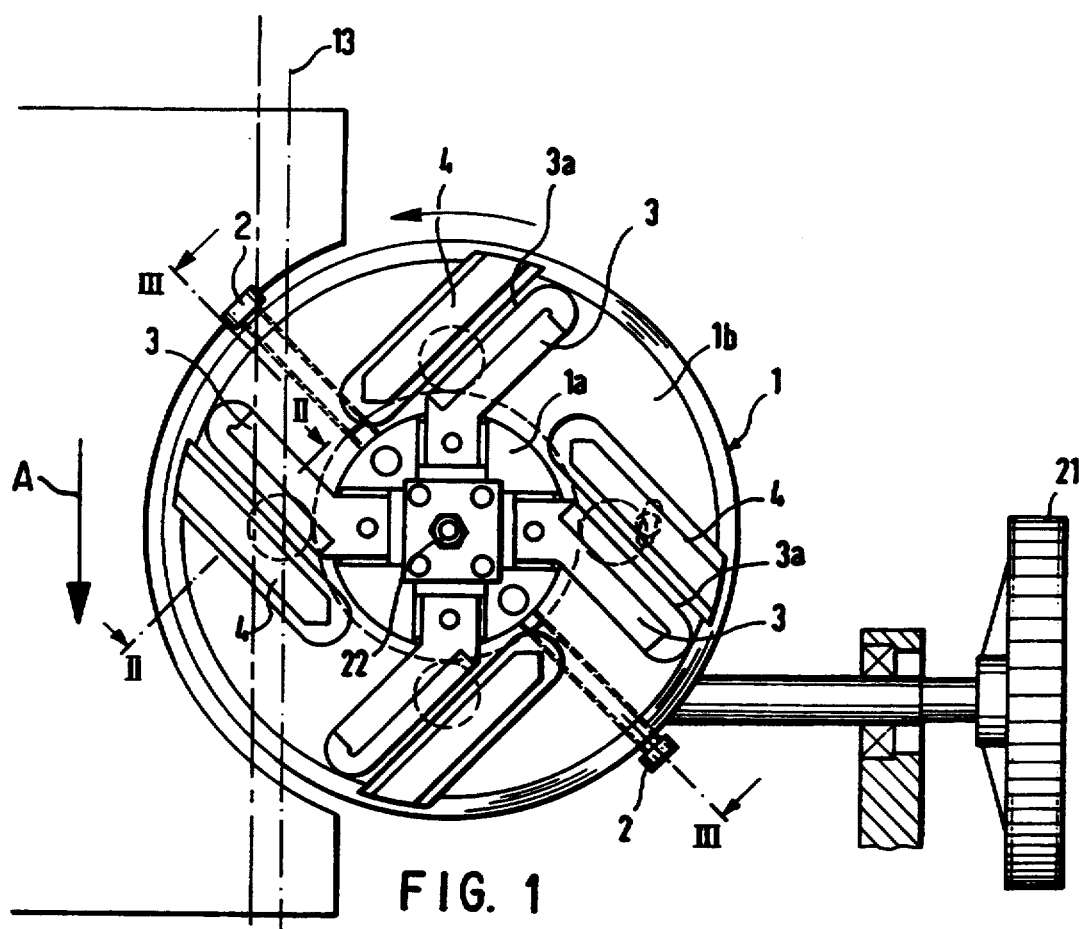
Figure 2:
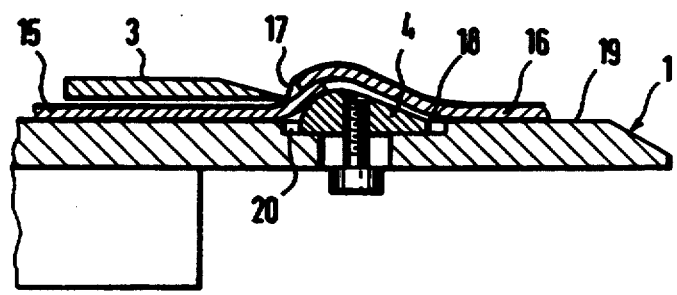
Figure 4:
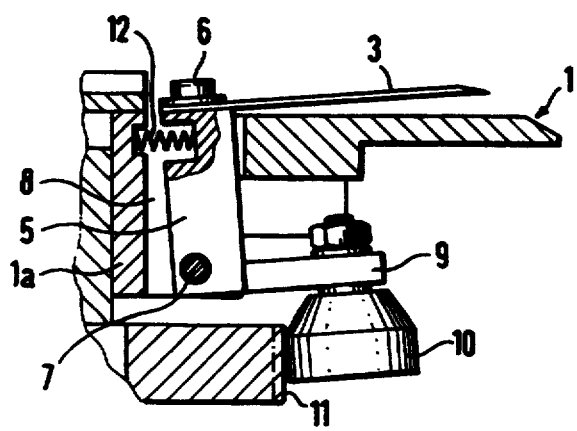
Figure 5:
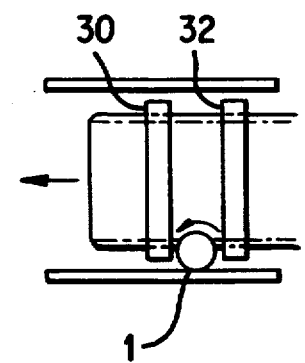
Figure 3:
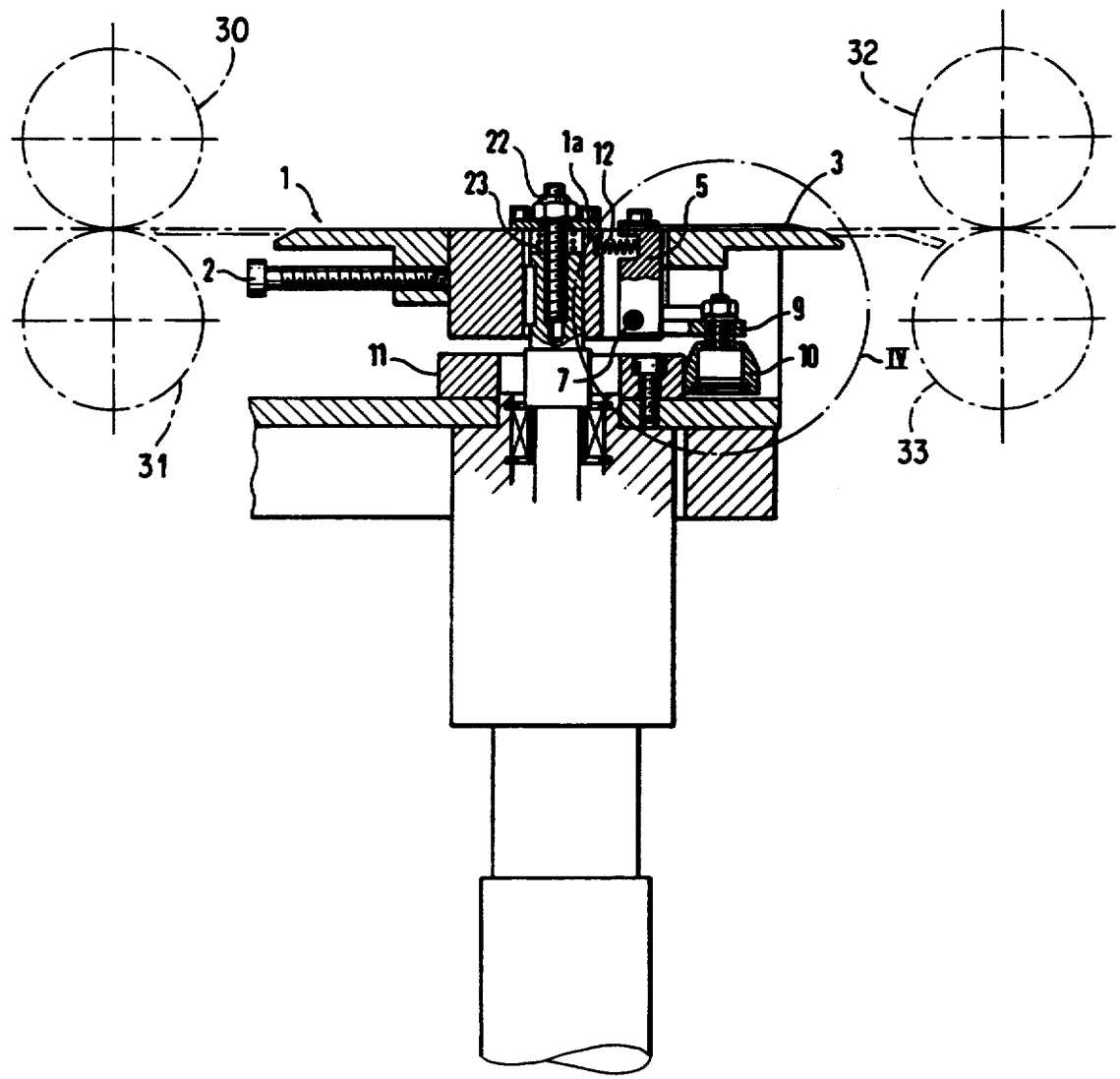

On a rotary table 1 with an inner central region 1a and an outer annular section 1b, which can be rotated relative to said inner central area 1a and arrested by set screws 2, four knives 3, distributed equidistantly, and four lifting wedges 4 preceding said clasp knives 3 are disposed, the lifting wedges 4 being mounted in each case on the outer annular section 1b, while the knives 3 are mounted in the central area 1a of the rotary table 1. The knives 3 are mounted by way of supporting bodies 5, at the upper ends of which the knives 3 are fastened exchangeably with the help of screws 6. The supporting bodies 5 are mounted at the lower end on an axis 7 of the central area 1a and penetrate a recess 8. At the lower end of the supporting body 5, a crossarm 9 with a sensing roller 10 is disposed. The sensing roller 10 runs along a stationary cam control 11 below the rotating rotary table 1. The knife as a whole is pretensioned in its operating position by means of a spring 12 and, with that, the sensing roller 10 is also pressed against the cam control 11. The sheets are moved in the direction of the arrow A shown in FIG. 1 in a manner that is well known, such as by rollers 30, 31, 32 and 33 shown in the FIGS. 3 and 5. The boundaries 13 and 14 of the sheets and of the laminating film are shown in broken lines in FIG. 1. The laminating film does not cover the sheets up to the edge but leaves a boundary of, for example, 5 mm which is represented by the distance between lines 13 and 14 in FIG. 1. The cam control 11 is constructed and disposed so that each knife 3, on arriving in FIG. 1 at the top, is located above the edge 13 of the sheet line of overlapped, individual sheets, which edge 13 is indicated by a dot-dash line, together with a film covering the individual sheets is in the raised position shown in FIG. 4 so that the knife can run over the edge 13 of the sheet line without being impeded. After running over the edge, the knife immediately is lowered into the position of FIGS. 2 and 3 (in the latter, the sheet line is not drawn in order to improve the clarity), in which it lies on the sheet line 14, so that the knife, when it exceeds an angle of about 90°, during which it runs on the sheet line, catches up with any overlapping edge present there and then cuts up the film 17 (FIG. 2) in the overlapping region between two sheets 15 and 16 about 3 cm in the edge region. By means of a severing apparatus with break rolls and tear-off rolls moving faster in comparison, a final separation of the sheets can then take place, after the film has first been incised once at the edge.

Due to the lifting wedges, which precede the knives 3, the overlapping region is inclined and, with that, an arrangement of the film 17 in the overlapping region is somewhat more inclined to the horizontal, so that the knife 3 is better able to incise, since for thin paper sheets 15, 16, the film runs almost horizontally in the overlapping region and thus can be taken hold of only with difficulty by the edge of the knife 3. The lifting wedges, the leading edges 18 of which lie in the surface 19 of the rotary table 1 or also are lowered below said surface 19, are disposed in recesses 20 of the rotary table 1.

At 21, a handwheel can be recognized, with the help of which the rotary table as a whole can be adjusted transversely to the running direction of the line, so that different line widths can be processed therewith and/or the depth of the incision can be varied. Moreover, the height of the rotary table over the nut 22 and the spring 23 can also be adjusted. The details of the driving mechanism for the rotary table, which preferably can comprise a direct-current motor, since such driving mechanisms are sufficiently well known in practice, are not shown. The only important feature here is that the driving mechanism can confer a rotational speed on the rotary table, so that the circumferential speed of the knife regions, incising the films to be severed, is considerably greater than the conveying speed of the sheet line, so that a knife can catch up from behind with an edge disposed in the overlapping region between the knife and the film line. In conjunction with the four knives shown, it is ensured in this way that, irrespective of how the overlapping regions arrive at the severing apparatus, severing of the film take place in any case.

We claim:

1. A severing apparatus for sheet-laminating machines for separating sheets transported as single sheets and a superimposed film layer with the film layer being severed at an edge region of an overlapping area, comprising a rotary table disposed at least partly in superimposed relationship with a sheet line in which the sheets including the film layer are conveyed, lifting wedges mounted on said rotary table, at least one knife means on said rotary table for severing said film layer, said lifting wedges being disposed ahead of said knife means considered in the direction of rotation of the table, pivot means pivotally mounting said knife means on said rotary table, cam means on said rotary table operably engageable with said pivot means to effect pivoting of said knife means between a raised position and a lowered operating position, and driving means for driving said rotary table at a rotary speed such that the circumferential speed of said knife means cutting into the film layer when said clasp knife means is in said lowered operating position is greater than the conveying speed of the sheet line.

2. A severing apparatus according to claim 1 wherein a plurality of said knife means are mounted on said rotary table.

3. A severing apparatus according to claim 2 wherein said rotary table comprises a recess, said pivot means comprising a support body disposed in said recess, said support body having a lower end pivotally mounted to said rotary table, said support body having an upper end on which said knife means is mounted, said pivot means further comprising a cross arm extending from said support body, a cam roller mounted on said cross arm, and a stationary cam engaged by said cam roller such that rotation of said rotary table about said stationary cam effects pivoting of said support arm as said cam roller engages said stationary cam.

4. A severing apparatus according to claim 3 further comprising biasing means biasing said support arm in a pivotal direction such that said cam roller is biased against said stationary cam, said biasing means thereby biasing said knife means toward said lowered operating position.

5. A severing apparatus according to claim 1 wherein said rotary table comprises an outer annular section and an inner central section, means on said rotary table for adjusting the relative position between said outer annular section and said inner central section, said lifting wedges being mounted on said outer annular section.

6. A severing apparatus according to claim 5 wherein said knife means is mounted on said inner central section.

7. A severing apparatus according to claim 1 wherein said wedges have leading edges, said rotary table having depressions in which said wedges with their leading edges are mounted.

8. A severing apparatus according to claim 1 further comprising adjustment means for adjusting said rotary table in a vertical direction.

9. A severing apparatus according to claim 1 further comprising means for adjusting the rotary table in a direction perpendicular to the running direction of the sheet line.

10. A severing apparatus according to claim 1 wherein said driving means comprises a direct current motor.

* * * * *